United States Patent [19]
Doolittle

[11] Patent Number: 5,379,651
[45] Date of Patent: Jan. 10, 1995

[54] POINT OPTICAL BEAM ELECTRONIC ROTAMETER

[75] Inventor: James Doolittle, Kalispell, Mont.
[73] Assignee: Semitool, Inc., Kalispell, Mont.
[21] Appl. No.: 193,785
[22] Filed: Feb. 7, 1994
[51] Int. Cl.6 ............................................. G01F 1/20
[52] U.S. Cl. ................................................ 73/861.56
[58] Field of Search ........................ 73/861.56, 861.57; 250/577

[56] References Cited

U.S. PATENT DOCUMENTS

| | | | |
|---|---|---|---|
| 4,335,618 | 6/1982 | Bucsky et al. | 73/861.56 |
| 4,566,337 | 1/1986 | Smart | 73/861.56 |
| 4,630,485 | 12/1986 | Wastl | 73/861.56 |
| 4,630,486 | 12/1986 | Miles et al. | 73/861.56 |
| 4,774,676 | 9/1988 | Stenzel et al. | 73/861.56 |
| 4,864,870 | 9/1989 | Payne et al. | 73/861.56 |
| 4,944,190 | 7/1990 | Scally et al. | 73/861.58 |
| 5,078,004 | 1/1992 | Nyseth | 73/861.55 |
| 5,099,698 | 3/1992 | Kath et al. | 73/861.56 |
| 5,187,988 | 2/1993 | Dettmer et al. | 73/861.53 |

Primary Examiner—Richard E. Chilcot, Jr.
Assistant Examiner—Harshad Patel
Attorney, Agent, or Firm—Wells, St. John, Roberts, Gregory & Matkin

[57] ABSTRACT

An improved electronic monitoring arrangement for a rotameter utilizes a single point source of radiation at one side of the rotameter and a vertical array of detectors diametrically opposite to it. The elevation of the radiation source is identical to the uppermost elevation of the radiation detectors. Radiation from the source will thereby intersect a common remote edge of the top surface of the float within the rotameter throughout its intended range of movement along the elevation covered by the array.

9 Claims, 7 Drawing Sheets

POINT OPTICAL BEAM ELECTRONIC ROTAMETER

TECHNICAL FIELD

This invention pertains to electronic measurement of fluid flow. More specifically, it presents a highly accurate flow meter for monitoring fluid flow in chemical process applications using relatively low flow rates.

BACKGROUND OF THE INVENTION

The monitoring and regulation of fluid flow is vital in many industrial processes, particularly where corrosive fluids are utilized in the manufacture of electronic products such as integrated circuit devices. As an example, the flow of acid across a wafer for etching purposes regulates the depth of the etch and resulting quality of the devices produced.

In view of the corrosive nature of the chemicals employed in etching integrated circuit devices, equipment for handling such liquids must be protected against corrosion. It is also desirable that the liquid be isolated from the associated monitoring elements that measure fluid flow.

The above process requirements have led to development of the present flow meter, which is relatively simple in construction and capable of providing extremely accurate flow readings. It utilizes a conventional metering tube, which is normally termed a rotameter. Rotameters are exceptionally effective for measuring small flow values and are readily available at a relatively low cost.

In this type of flow meter, the weight of a float is balanced against upward forces imparted upon it by a moving fluid. Changes in flow rate result in changes in the upward force, with the float seeking an equilibrium position in a surrounding tapered metering tube. Although rotameters are very often made of glass, they can be constructed of other materials transparent to various forms of radiation. When coupled with radiation detectors, measurements of flow can be achieved by monitoring and measuring the elevation of the float without access to the liquid. Thus, a corrosive fluid can be isolated from an electronic flow detection system adjacent to the exterior of the tube.

The present invention was developed in an effort to improve upon previous detection systems for rotameters by eliminating precise calibration requirements, while decreasing the of incremental measurements that can be efficiently handled.

BRIEF DESCRIPTION OF THE DRAWINGS

Preferred embodiments of the invention are described below with reference to the accompanying drawings, which are briefly described below.

FIG. 1 is a diagrammatic view illustrating the primary elements of the present disclosure;

DETAILED DESCRIPTION OF THE PREFERRED EMBODIMENTS

Figure 2:
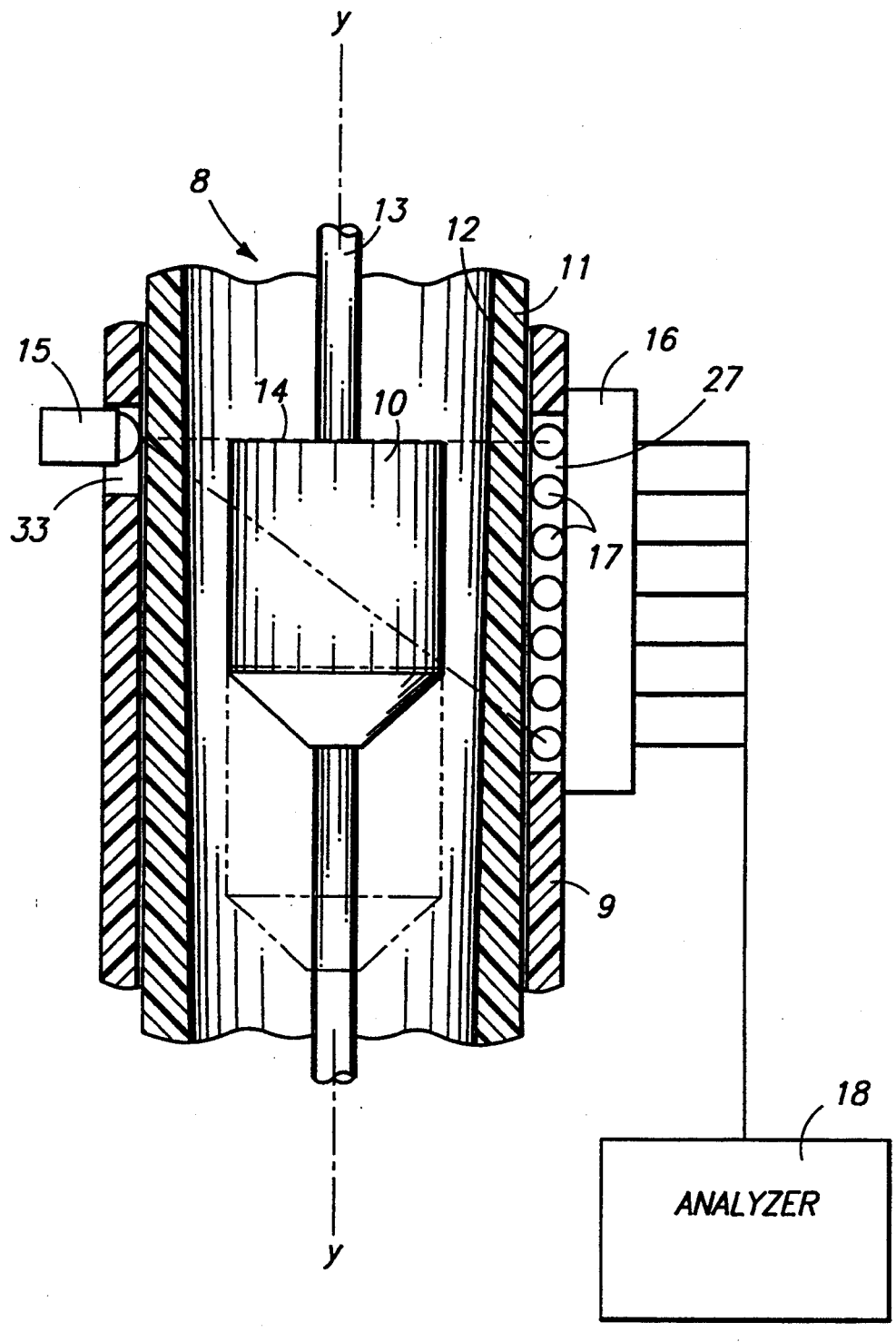
FIG. 2 a perspective view of the assembled flow meter.
Figure 2:
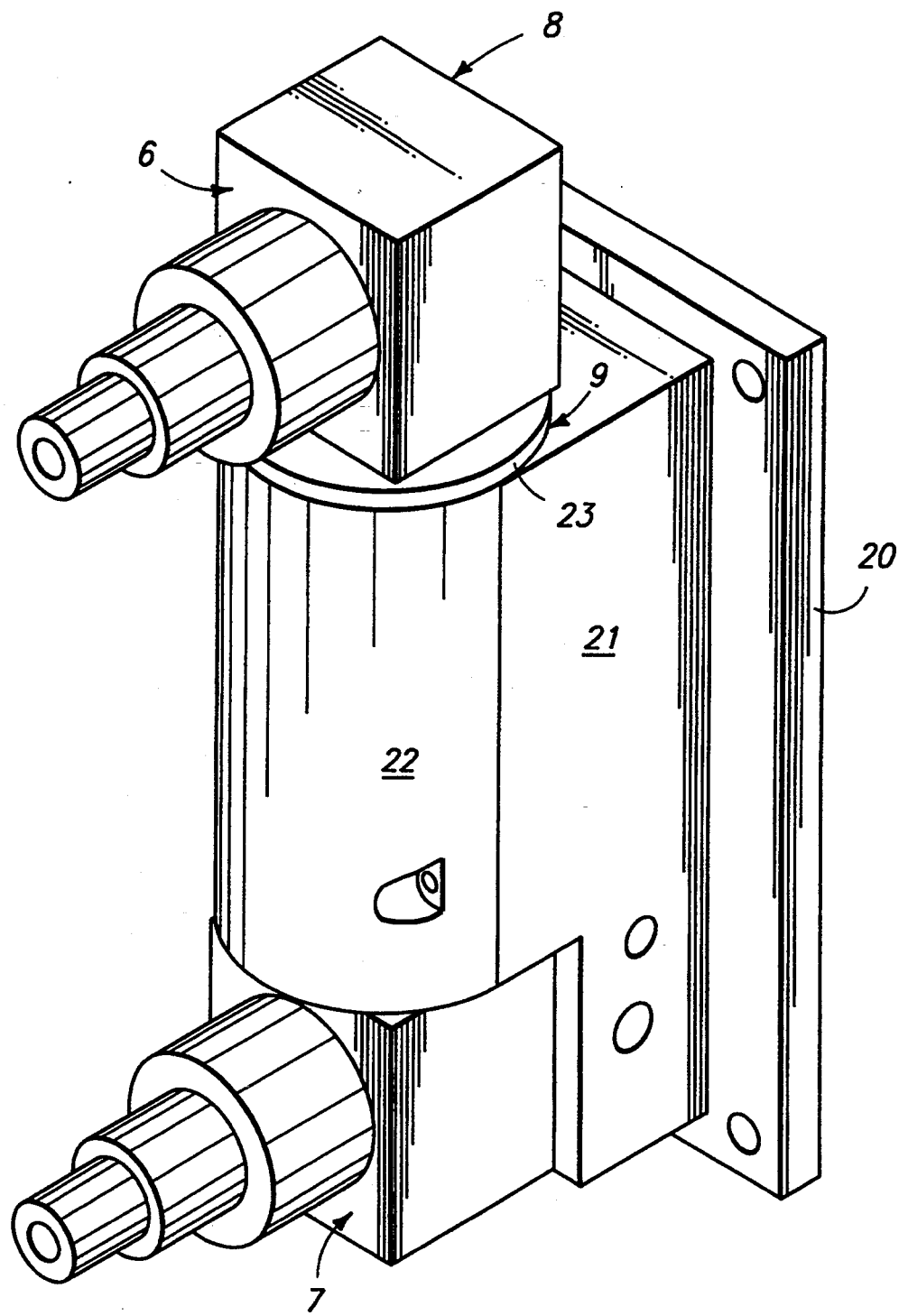

This disclosure of the invention is submitted in furtherance of the constitutional purposes of the U.S. Patent Laws "to promote the progress of science and useful arts" (Article 1, Section 8).

FIG. 1 basically illustrates the principles embodied within the invention. A flow responsive member, illustrated as a vertically movable float 10, is guided within a cylindrical flow tube 11 for motion along a path centered about a vertical axis y—y. The tube 11 and float 10 are common components of a conventional rotameter, such as the Pathfinder Low Flow Series of Teflon flow meters produced by Future Star, of Edina, Minn.

Float 10 is guided within the rotameter along a fixed central rod 13. The inner surface 12 of tube 11 defines a flow channel which is tapered in the conventional manner. Float 10 is free to move vertically along rod 13 to seek an equilibrium elevation dependent upon the upward rate of fluid flow of a fluid stream passing through the vertical tube.

Tube 11 and float 10 constitute the central portion of a conventional rotameter 8. The rotameter is completed by a lower inlet assembly 7 and an upper outlet assembly 6 to which inlet and outlet hoses (not shown) can be clamped as the rotameter is operatively inserted within a monitored fluid circuit.

The operation of such a flow meter is well known. No further description of this conventional component is believed to be required for an understanding of the present improvement.

Figure 3:
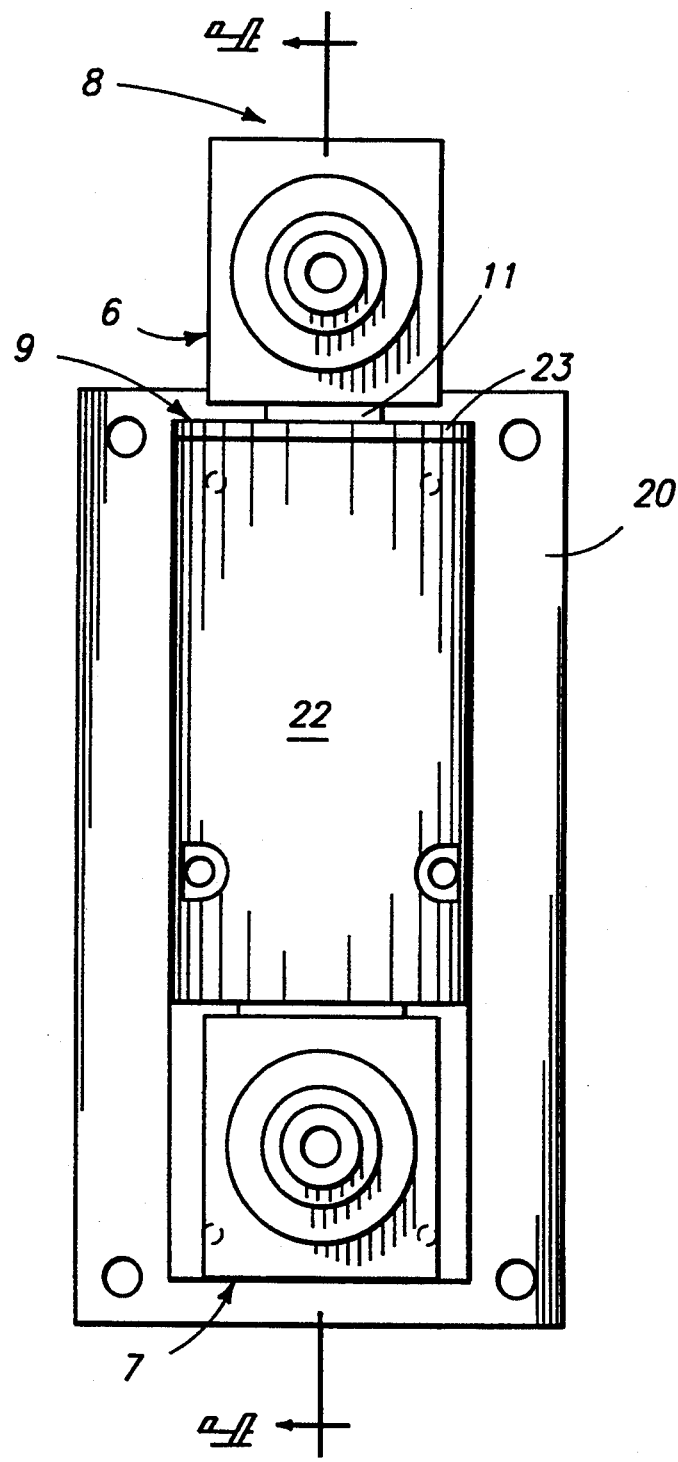
FIG. 3 a front view of the flow meter.
Figure 4:
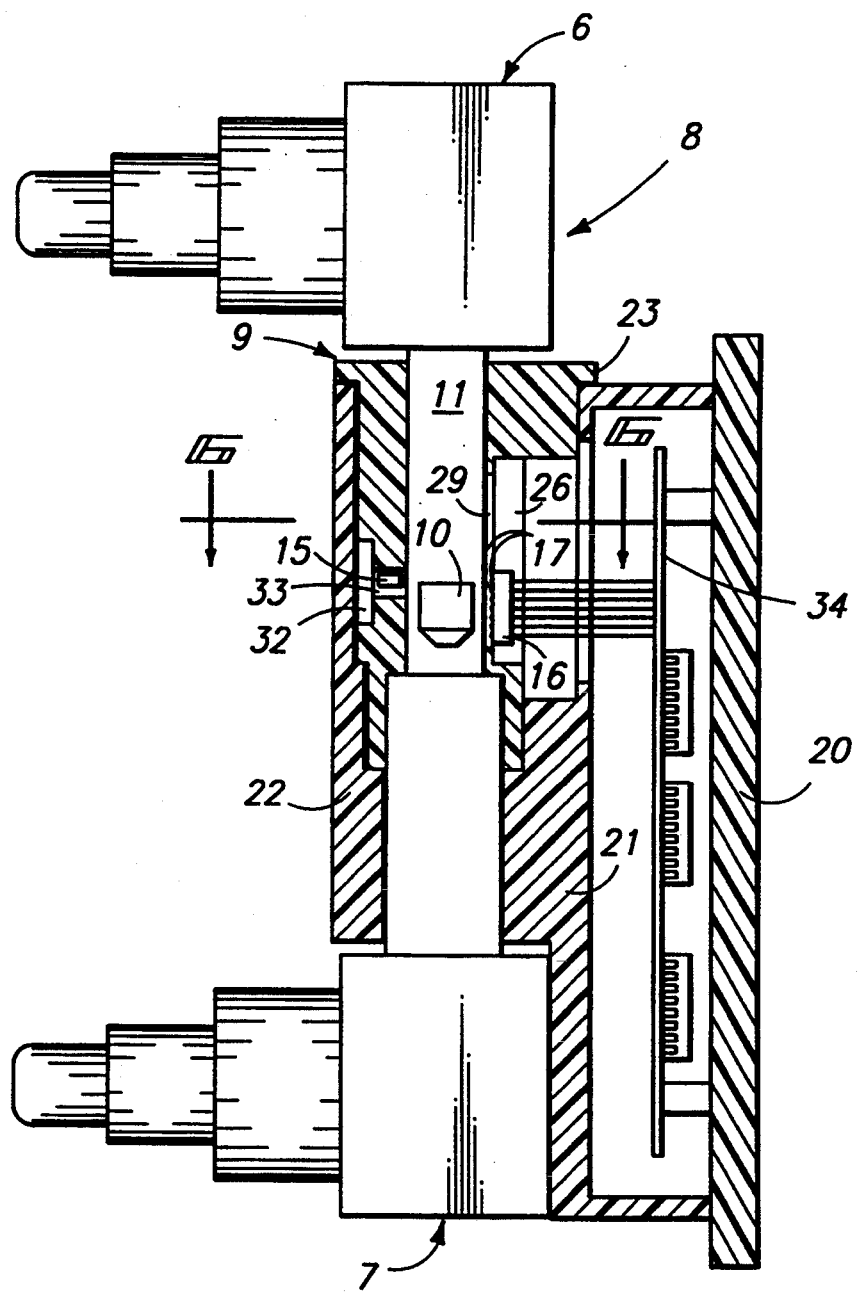
FIG. 4 a sectional view taken along line 4—4 in FIG. 3.

Float 10 has a transverse top surface 14 which is perpendicular to the central axis of tube 11, which is illustrated in FIG. 3 as axis Y—Y. The exterior of both float 10 and tube 11 are typically cylindrical in shape, although their specific shapes are not of significance to an understanding of the present invention.

The present detection system involves use of a single point source of radiation, illustrated by an infrared Light Emitting Diode (LED) 15 and an associated vertical array of radiation detectors or pixels 17. This array is preferably provided within a conventional Charge Coupled Device (CCD) 16. The LED 15 is located at one side and approximate to the path of the float 10. It is preferably adjacent to the exterior surface of tube 11. The CCD 16 preferably presents a vertical row of radiation responsive pixels 17 arranged parallel to axis Y—Y. The radiation detectors or pixels 17 are diametrically opposite to the associated radiation source (LED 15) and also are proximate to the path of float 10. It is preferred that the pixels 17 be adjacent to the outside surface of tube 11.

The Light Emitting Diode 15 is a conventional point beam source for producing an optical beam, such point beam sources are produced by many available manufacturers. In this particular embodiment, the radiation provided by it is in the infrared range. This permits a wide variety of materials to be used in the rotameter tube 11, so long as the tube is transparent to infrared rays. Conversely, the material comprising the float 10 should be opaque to such rays.

Light Emitting Diode 15 should also be selected as one having no focusing lens, since the radiation from it must be spread vertically for detection along the height of the receiving array of pixels in the associated CCD 16. The radiation intensity at each of the detection pixels 17 within CCD 16 will be relatively constant along the full height of the pixel array.

Aperture 33, through which radiation is projected from Light Emitting Diode 15, is vertically elongated. This eliminates mechanical interference that might modify the radiation intensity levels directed to the lowermost radiation detectors or pixels 17 within CCD 16.

An example of a suitable Charge Coupled Device 16 is a 64×1 integrated opto sensor identified as Model TSL 214 and produced by Texas Instruments. It consists of 64 charge-mode pixels arranged in a 64×1 linear array. Each pixel measures 120μm×70μm with a 125μm center-to-center spacing. This sensor is used in a wide variety of applications, including linear encoding. Its application to the present equipment and its interface to conventional analyzing electronic circuits or computerized circuits is believed to be readily understandable by those skilled in this field.

The LED 15 and CCD 16 are supported on a circumferential spool 9 that surrounds and abuts at least a portion of tube 11. Spool 9 accurately locates the source of radiation at a position diametrically opposite to the receiving array of detectors. It supports and maintains these operative elements in fixed positions relative to one another and relative to tube 11 for consistent and accurate measurement of the instantaneous elevation of float 10.

As will be evident from a study of FIG. 1, the elevational location of float 10 between the LED 15 and CCD 16 will affect reception of radiation by the individual pixels 17. The reception of radiation will be determined by the resulting location of the upper end of the shadow cast by the float 10 across the receiving array of pixels 17. Electronic circuits included within an analyzer 18 are operatively connected to the pixels 17 for electronically monitoring the affected pixels 17 and for converting such monitored data into a measured flow value for recording or monitoring purposes.

The LED 15 is located at an elevation identical to the elevation of an end radiation detector within the array. In this improvement, the LED 15 is located at an elevation identical to the elevation of the uppermost pixel 17 within CCD 16. Thus, radiation passing across the tube 11 from the LED 15 will always intersect a common shadow defining edge of the top surface 14 of the movable float 10 regardless of the position of float 10 along the elevation covered by the opposing array of pixels 17 as its shadow is cast upon the array. The consistent intersection of radiation across the top surface 14 and a single edge of the top surface will provide a distinct demarcation or shadow line between the unobstructed radiation above the float 10 and the shadow adjacent to it.

The distinct pattern cast upon the pixels 17 by the LED 15 being located at the uppermost elevation of the array of detecting pixels in the preferred embodiment can be contrasted to that achieved by using an extended vertical source of radiation, which would create differing shadow patterns on the array of pixels depending upon the relative elevational position assumed at any given time by the movable float. Furthermore, if a point source of radiation were to be located intermediate the extreme elevations of the matrix detectors, the radiation would intersect the adjacent edge of the top surface of float 10 while the upper surface 14 of float 10 is above the radiation source and would intersect its remote edge while the float 10 is beneath the radiation source. The spatial transition which would take place as the float 10 passes the point source of radiation would produce a discontinuity in the pattern of radiation received by the CCD 16. Such a discontinuity would either affect readings in this area of transition or would require more elaborate electronic correction.

FIGS. 2-9 illustrate details of the present preferred embodiment. Since a rotameter must be utilized in a vertical position, the mounting arrangement for this equipment must so orient the rotameter described above. The mount includes a vertical base 20 adapted to be secured to a supporting vertical wall (not shown) within the equipment in which the electronic flow meter is to be used. A vertical support block 21 is fixed to the outer face of base 20. A complementary clamping cover 22 is releasably attached to the support block 21 to hold the spool 9 and rotameter 8 securely in place between these two complementary elements.

Figure 5:
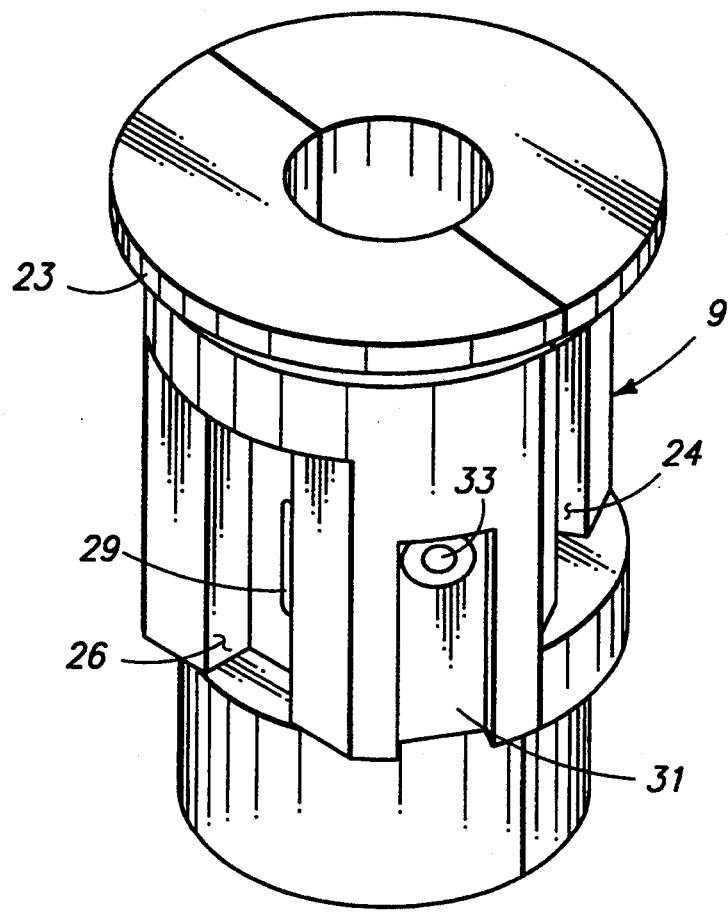
FIG. 5 a perspective view of the spool.
Figure 6:
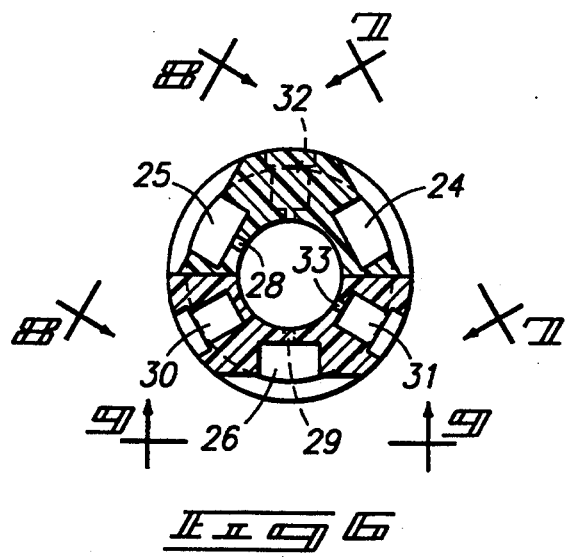
FIG. 6 is a sectional view of the assembled spool alone, as seen along line 6—6 in FIG. 4.
Figure 7:
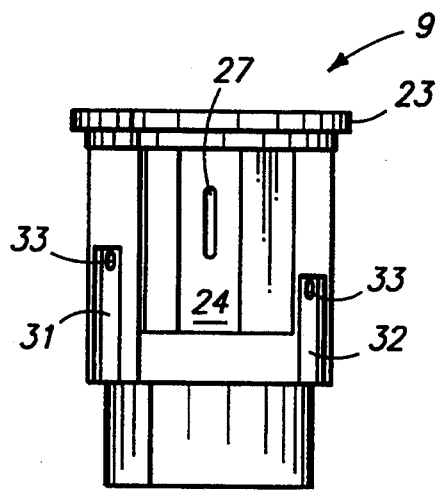
FIG. 7 an elevation of the spool is view as seen along line 7—7 in FIG. 6.
Figure 8:
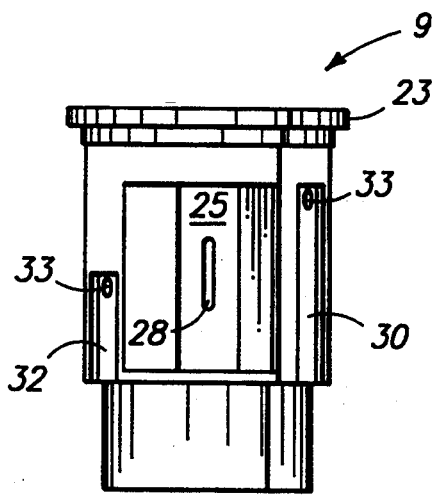
FIG. 8 an elevation of the spool is view as seen along line 8—8 in FIG. 6.
Figure 9:
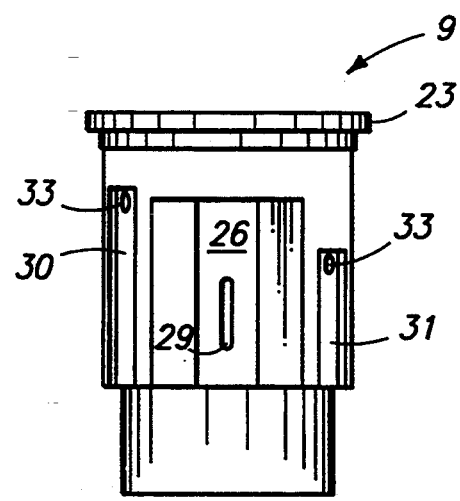
FIG. 9 an elevation of the spool is view as seen along line 9—9 in FIG. 6.

FIGS. 5-9 show details of the mounting spool 9 that carry the paired Light Emitting Diodes 15 and charge coupled devices 16. Spool 9 is constructed in two complementary halves that respectively wrap about one-half of the rotameter tube 11 in a close fitting relationship (FIGS. 5 and 6). The spool 9 is capped by an annular shoulder 23 which rests on the assembled support block 21 and clamping cover 22 to elevationally locate spool 9 relative to the base 20 of this device.

Spool 9 is provided with three mounting recesses 24, 25 and 26, which are each shaped to support the physical characteristics of the selected CCD 16 or other form of radiation detector. The illustrated recesses 24–26 are equiangularly spaced apart from one another (by an angle of 120°). Each recess 24, 25 and 26 includes a vertical access slit 27, 28 and 29, respectively, through which radiation is directed to the array of pixels 17 within the CCD 16.

Both the mounting recesses and slits are staggered in elevation about the circumference of spool 9. Their elevations slightly overlap one another so that the three charge coupled devices effectively combine to present a continuous vertical array of pixels having a total height three times greater than the individual heights of the pixel array in a single CCD 16.

As an example, the vertical height of spool 9 from its lower edge to the lower edge of shoulder 23 might nominally be 2 inches and the nominal height of the slits 27, 28 and 29 might be 0.4 inches. The vertical spacing between the lower edge of spool 9 and the lower end of slits 27, 28 and 29 might be approximately 1.3 inches, 1.0 inches, and 0.8 inches, respectively. While these dimensions include some elevational overlap between the respective slits, the array of detectors or pixels located within the slits should be selected and positioned to present a continuous elevational array with the three arrays having complementary elevational positions about the spool 9.

Spool 9 also includes three mounting recesses 30, 31 and 32 that are diametrically opposite to the mounting recesses 24, 25 and 26, respectively. Mounting recesses 30, 31 and 32 are shaped to receive and locate individual Light Emitting Diodes 15. They terminate inwardly vertically elongated apertures 33 sized so that each Light Emitting Diode 15 is positioned at the upper end of an aperture 33 and is exposed to the tube 11 of the rotameter. The downward extension of each aperture 33 assures that radiation from each LED will cover the opposed elevation of the receiving CCD without obstruction by the supporting spool 9.

As previously described, the LED 15 is centered at an elevation identical to the elevation of the uppermost radiation detector or pixel 17 within array 16. The operational advantages of this elevational relationship have been described above.

The number of detection units (LED plus CCD) arranged about tube 11 can be one or more, depending upon the resolution desired and the total elevational movement that is to be monitored with respect to float 10. By equiangularly locating a plurality of sources of radiation and their associated detection arrays as shown, one can minimize background radiation directed to the other arrays.

Analyzer 18 electronically monitors the arrays of radiation detectors or pixels and translates the monitored data into usable information, such as an audible or visual signal, or a numerical display of flow rates. Its electronic components can be physically located on a printed circuitboard 34 within the interior recess of block 21. Electrical leads (not shown) can extend outwardly from the support block 21 to associated process equipment. Electrical leads from the CCD to the printed circuitboard 34 can be flexible, if desired, or they can be rigid connections, either direct or through an interposed connector of conventional design.

The use of Charge Coupled Devices as the arrays 16 in this application allows the analog signals produced at each pixel 17 to be converted to a digital signal at an adjustable threshold level directly from the active element or pixel. This eliminates electrical error that might otherwise be caused by temperature variations of the fluid being measured, drift error caused by power supply fluctuations and normal aging characteristics associated with all electronic components. Also, by proper threshold adjustment, no further signal amplification or conditioning is necessary in displaying the resulting computerized input or digital readout information as desired in a particular application of the invention. The output level of Charge Coupled Devices is sufficiently high to allow direct integration to other electronic equipment.

The unique geometry provided in the relationship between each LED 15 and its associated CCD 16 requires only one point source of radiation per receiving array of detectors. This reduces the power requirements of the assembly to a minimum. It also eliminates the need for matched pairs of emitters and detectors in the one-to-one ratio required in previously proposed designs of equipment for reading the elevation of a movable float within a rotameter.

The pixels 17 within the each CCD 16 are preferably linearly spaced from one another a vertical, single sine array, thereby removing the need for complex linearizing circuits. Because of their close separation within the array, linearizing the resulting signals is not required, as it has been where larger phototransistors or optical potentiometers have been used in similar applications. Extremely high resolution is available by using conventional Charge Coupled Devices as opposed to phototransistors or other types of optical sensing arrays.

To remove ambient light error, CCD 16 should be provided with an optical bandpass filter allowing only the passage of infrared light from the associated LED 15 to be recorded. Such filters are conventional and need not be further described in order to permit one to utilize this invention.

The direct coupling of array 16 and radiation source 15 eliminates any necessity for optics in this assembly. It is preferable that each LED 15 not include any lens, and no additional lenses are needed between the LED and the receiving CCD 16. The exclusion of optical lenses eliminates light distortion and the requirement for mechanical adjustment of the affected elements. This allows the invention to be implemented on multiple rotameters with different flow rates without the need for mechanical calibration of each unit.

Figure 10:
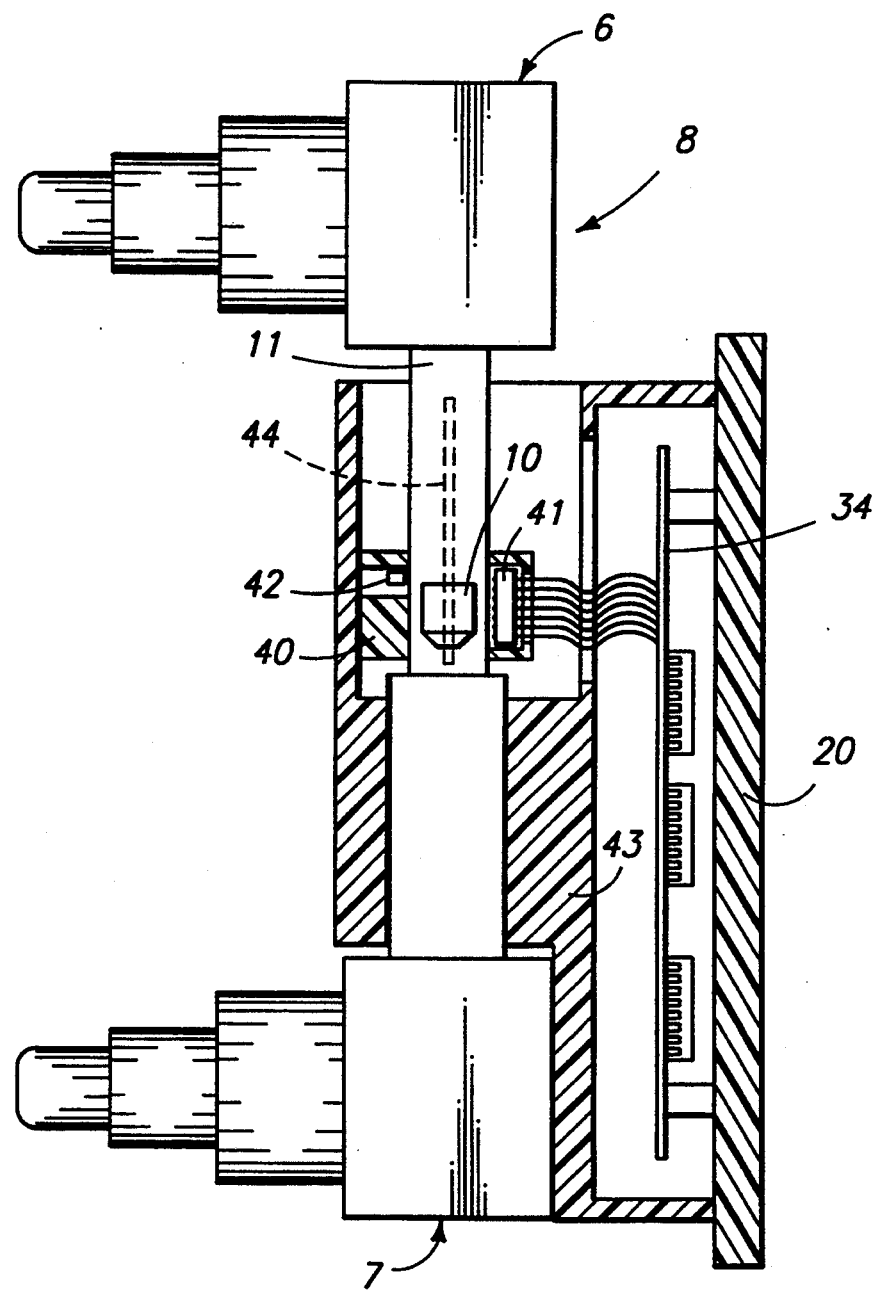
FIG. 10 is a view similar to FIG. 4, but illustrating a second mounting arrangement for the spool.

FIG. 10 generally illustrates a modification of the invention. Where a relatively narrow range of flow rates is to be monitored, a single CCD 41 and associated LED 42 might be located diametrically opposite to one another on a supporting spool 40. In this instance, the spool 40 is much shorter in height than that previously described, since it only requires sufficient height to support a single CCD 41.

Spool 40 abuts and is slidable along the cylindrical portion of tube 11 for vertical adjustment as dictated by the monitored flow conditions in a particular application. A vertical slide mechanically interconnecting the support block 43 and spool 40 is generally illustrated by dashed lines 44. The dashed lines 44 are intended to illustrate the general features of a vertical slide mechanically interconnecting the modified spool 40 to guide it in a vertical direction relative to the surrounded tube 11. By selectively locking the slide 44 and/or spool 40 relative to the adjacent support block 43, one can elevationally locate the LED 42 and CCD 41 to overlap the expected range of movement of float 10 over the flow rate values being monitored.

In general, any physical mounting arrangement for varying the elevation of spool 40 with respect to the surrounded rotameter can be substituted in place of the fixed arrangement illustrated in the preceding figures.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An electronic flowmeter, comprising:
    a flow tube having a flow channel; said flow tube serving to convey a fluid stream longitudinally through the flow channel for which the flow rate is to be measured;
    a flow-responsive member movable within the flow channel of the flow tube; said flow-responsive member being movable within the flow channel along a path which extends longitudinally along the flow tube in response to varying flow rates of the fluid stream;
    a point beam source for producing an optical beam which beams from a point location across the flow tube;
    a detector array mounted adjacent the flow tube in opposing relationship to the optical beam so that the optical beam passes across the flow channel and is detected by the detector array; the detector array having detector pixels arranged at different longitudinal positions along the flow tube;

said optical beam being capable of detection by said detector array when the optical beam directly impinges upon one or more of the pixels of said detector array;

said detector array being arranged so as not to significantly detect an optical beam from a source other than said point beam source;

said flow tube being sufficiently transparent to allow the optical beam to beam from said point beam source across the flow tube and upon said detector array;

a shadow-defining edge formed upon the flow-responsive member;

said shadow-defining edge, point source of radiation, and detector array being constructed and positioned so that the shadow-defining edge casts a shadow line when the flow-responsive member is positioned between the point beam source and the detector array; said shadow line functioning to move upon the detector array in response to movement of said flow-responsive member along said path; said shadow line being defined by said shadow-defining edge for all positions of the shadow line upon pixels of the detector array.

2. An electronic flowmeter according to claim 1 wherein there are a plurality of detector arrays, each detector array having a single associated point beam source to form detector array-beam source pairs; said detector array-beam source pairs being arranged to prevent optical beams from one of said pairs from being significantly detected by another of said pairs.

3. An electronic flowmeter according to claim 1 wherein there are a plurality of detector arrays, each detector array having a single associated point beam source to form detector array-beam source pairs; said detector array-beam source pairs being arranged to prevent optical beams from one of said pairs from being significantly detected by another of said pairs; said detector array-beam source pairs being spaced at equiangularly spaced positions about the flow channel.

4. An electronic flowmeter according to claim 1 wherein there are a plurality of detector arrays, each detector array having a single associated point beam source to form detector array-beam source pairs; said detector array-beam source pairs being arranged to prevent optical beams from one of said pairs from being significantly detected by another of said pairs; said detector array-beam source pairs being spaced at equiangularly spaced positions of approximately 120° about the flow channel.

5. An electronic flowmeter according to claim 1 wherein the point beam source is positioned at a position opposite the end of the detector array.

6. An electronic flowmeter according to claim 1 wherein the point beam source is positioned at a position opposite the upper end of the detector array.

7. An electronic flowmeter according to claim 1 wherein the point beam source is positioned at a position longitudinally removed from the detector array.

8. An electronic flowmeter according to claim 1 wherein the point beam source and detector array are mounted in a spool in relatively fixed relationship; said spool being mounted adjacent to the flow tube.

9. An electronic flowmeter according to claim 1 wherein the detector array is a charge coupled device (CCD).

* * * * *